(12) United States Patent
Ashby (10) Patent No.: US 7,794,015 B1
(45) Date of Patent: Sep. 14, 2010

(54) MULTI-PASSENGER VEHICLE CHILD SEAT ASSEMBLY AND ASSOCIATED METHOD

(76) Inventor: Kenny Ashby, 1151 Congress Ave., Teaneck, NJ (US) 07666

( * ) Notice: Subject to any disclaimer, the term of this patent is extended or adjusted under 35 U.S.C. 154(b) by 21 days.

(21) Appl. No.: 12/220,110

(22) Filed: Jul. 22, 2008

(51) Int. Cl.
A47C 15/00 (2006.01)
A47D 1/10 (2006.01)
B60N 2/26 (2006.01)

(52) U.S. Cl. ............... 297/248; 297/250.1; 297/216.11
(58) Field of Classification Search ............... 297/248, 297/244, 232, 250.1, 256.15, 216.11, 216.16–216.18
See application file for complete search history.

(56) References Cited

U.S. PATENT DOCUMENTS

| 1,707,186 | A | * | 3/1929 | Ruth | 280/658 |
| 2,371,811 | A | * | 3/1945 | Ericsson | 280/408 |
| 2,751,969 | A | * | 6/1956 | Willem | 297/248 |
| 3,944,282 | A | * | 3/1976 | Nakamura | 297/440.14 |
| 4,655,504 | A | * | 4/1987 | Weber | 297/239 |
| 5,303,980 | A | * | 4/1994 | Young | 297/251 |
| 5,509,720 | A | * | 4/1996 | Croom | 297/440.14 |
| 5,518,293 | A | * | 5/1996 | Coy et al. | 297/248 |
| 5,542,159 | A | * | 8/1996 | Schultz et al. | 24/341 |
| 5,560,678 | A | * | 10/1996 | Eppelt | 297/248 |
| 5,664,830 | A | * | 9/1997 | Garcia et al. | 297/216.11 |
| 5,863,096 | A | * | 1/1999 | Bartlmae | 297/248 |
| 6,063,007 | A | * | 5/2000 | Sithole | 482/52 |
| 6,331,033 | B2 | * | 12/2001 | Lau | 297/325 |
| 7,344,193 | B1 | * | 3/2008 | Carrier et al. | 297/248 |
| 7,407,226 | B2 | * | 8/2008 | Macliver | 297/216.11 |
| 2007/0108812 | A1 | * | 5/2007 | Haun et al. | 297/248 |

FOREIGN PATENT DOCUMENTS

DE 19843870 A1 * 3/2000
WO WO 2008053214 A1 * 5/2008

* cited by examiner

Primary Examiner—David Dunn
Assistant Examiner—Tania Abraham (57) ABSTRACT

A multi-passenger vehicle child seat assembly for permitting an adult passenger to comfortably sit with first and second infant passengers in a rear seat of an existing vehicle preferably includes a mechanism for removably interlocking the first and second vehicle child seats together by displacing the medial edges along a first linear travel path until directly engaging each other. The assembly may also include a mechanism for absorbing impact forces exerted against the first and second vehicle child seats by resiliently oscillating the medial edges along a second linear travel path.

14 Claims, 10 Drawing Sheets

MULTI-PASSENGER VEHICLE CHILD SEAT ASSEMBLY AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to child seats and, more particularly, to a multi-passenger vehicle child seat assembly and associated method for permitting an adult passenger to comfortably sit with first and second infant passengers in a rear seat of an existing vehicle.

2. Prior Art

Anyone who has traveled in a back seat with two infants would attest, sitting wedged between two full size car seats can be both awkward and uncomfortable. According to legislation that was passed in the United States, children up to the age of 8 or the weight of 80 pounds must ride in a safety or booster seat in the while rear of an automobile. This has resulted in higher demand for vehicular safety seats capable of carrying two children.

U.S. Pat. No. 6,935,652 to Fair discloses a folding frame type tandem stroller which includes at least one side step and a side portion of the folding frame configured to provide a side access region to the rear seat. A canopy rod actuated locking assembly locks a stroller folding frame in an open position. A front seat tray is pivotable in two directions and a canopy rod assembly is retractable to facilitate a compact folded size of a stroller. Unfortunately, this prior art example offers no relief for parents who wish to transport their two infants or small children via automobile.

U.S. Pat. No. 6,045,183 to Weber discloses a child seat for vehicles, particularly for passenger cars, having a seat bucket which has a seat surface, a back support and two side parts which laterally bound this back support. For improving such a child seat such that new function areas are opened up for the child, guide rails are in each case arranged on the upper edge of the two lateral parts and, in each guide rail, a structural part projecting upwards on the side part is displaceably accommodated by way of a guiding foot. The two structural parts are constructed such that they are capable of forming support cheeks in a displacement position situated in the head area of the seat bucket, and the guiding feet can be locked at least in the displacement position situated in the head area and in a displacement position situated in the leg area, in which case the structural parts can be used in the latter displacement position for forming a table surface. Unfortunately, this prior art example offers no relief to a parent who wishes to sit comfortably in the rear seat of an automobile while their two infants or small children are also being transported in the rear seats of such an automobile because each infant or small child requires a separate child seat.

U.S. Pat. No. 5,135,285 to Dukatz discloses a twin shoulder belt adjustment mechanism for a child restraint system, including a plurality of vertically spaced apart and slightly vertically offset restraint slots for holding the belts in use. Respective adjustment slits extend laterally from the restraint slots, with a downwardly extending connector slit interconnecting and extending beyond the outer ends of the lateral adjustment slits, such that the twin belts may be moved there through to a higher or lower pair of restraint slots to accommodate a different size child. Unfortunately, this prior art example offers no relief to a parent who wishes for their two infants or small children to safely occupy a single seat while being transported by an automobile. Further, this prior art examples offers no relief to a parent who wishes to removably interlock the child safety seats so that such safety seats may be connected or disconnected.

Accordingly, the present invention is disclosed in order to overcome the above-noted shortcomings. The multi-passenger vehicle child seat assembly satisfies such a need by providing an assembly that is convenient and easy to use, is durable yet lightweight in design, is versatile in its applications, and effectively allows consumers to comfortably sit with first and second infant passengers in a rear seat of an existing vehicle.

BRIEF SUMMARY OF THE INVENTION

In view of the foregoing background, it is therefore an object of the present invention to provide an assembly for permitting an adult passenger to comfortably sit with first and second infant passengers in a rear seat of an existing vehicle. These and other objects, features, and advantages of the invention are provided by a multi-passenger vehicle child seat assembly.

In a preferred embodiment of the present invention, a multi-passenger vehicle child seat assembly may include corresponding planar medial edges facing each other respectively. Such an assembly may further include a mechanism for effectively removably interlocking the first and second vehicle child seats together by displacing medial edges along a first linear travel path until directly engaging each other. Such medial edges may be aligned parallel to each other and may remain directly engaged along the entire longitudinal lengths thereof respectively. The first linear travel path may be oriented perpendicular to the medial edges. The removably interlocking mechanism may further include an elongated groove formed within the second vehicle child seat and has a longitudinal length registered parallel to the medial edge of the second vehicle child seat.

The removably interlocking mechanism preferably includes a tongue extending outwardly from the first vehicle child seat and may have a longitudinal length registered parallel to the medial edge of the first vehicle child seat. Such a tongue may be slidably interfitted within the groove when the medial edges of the first and second vehicle child seats are engaged together. The removably interlocking mechanism may also include first and second pluralities of notches formed within the first and second vehicle child seats respectively and may be oppositely aligned along the medial edges thereof respectively. The removably interlocking mechanism may also further include a plurality of couplings adjustably seated within the first plurality of notches and may be adjustably displaced outwardly therefrom along corresponding third linear travel paths that terminate within the second plurality of notches respectively, such that the couplings traverse the medial edges when the first and second vehicle child seats are interlocked together. Such couplings are preferably adapted to removably interlocked positions within the second plurality of notches when the first and second pluralities of notches are aligned with each other.

The removably interlocking mechanism may also include a plurality of first resilient spring members. Such a plurality of first resilient spring members preferably have axially opposed ends statically anchored to a wall of the first plurality of notches and the couplings respectively. Such first spring members may be compressed while the first and second pluralities of notches are not oppositely aligned from each other respectively.

Each of the second plurality of notches may i be spaced inwardly from anterior and posterior sides of the second vehicle child seat respectively. The couplings may be frictionally urged along a planar receiving surface defined within the second plurality of notches when the couplings are biased to a terminating end of the third linear travel paths respectively.

The assembly may also include a mechanism for absorbing impact forces exerted against the first and second vehicle child seats by resiliently oscillating the medial edges along a second linear travel path. Such a second linear travel path is preferably registered parallel to the medial edges and may extend along a minor portion of the longitudinal lengths thereof respectively. The first and second linear travel paths may be registered orthogonal to each other. The impact forces absorbing mechanism preferably also includes a plurality of resilient second spring members permanently seated with the second plurality of notches respectively. Each of such second spring members may be advantageously statically anchored to one wall of the second pluralities of notches respectively.

The impact forces absorbing mechanism may also include a plurality of ball bearings connected to one end of the second spring members respectively. The couplings may be preferably provided with depressions formed along one sidewall thereof respectively. Such depressions may receive the ball bearings therein when the couplings are displaced to the terminating end of the third linear travel paths respectively and thereby maintain a tensioned interaction with the second spring members when the couplings are disposed within the second plurality of notches respectively. One of the second spring members may be compressed along the second linear travel path while another one of the second spring members may be expanded along the second linear travel path as the first spring members are extended and retracted parallel to the first linear travel paths respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
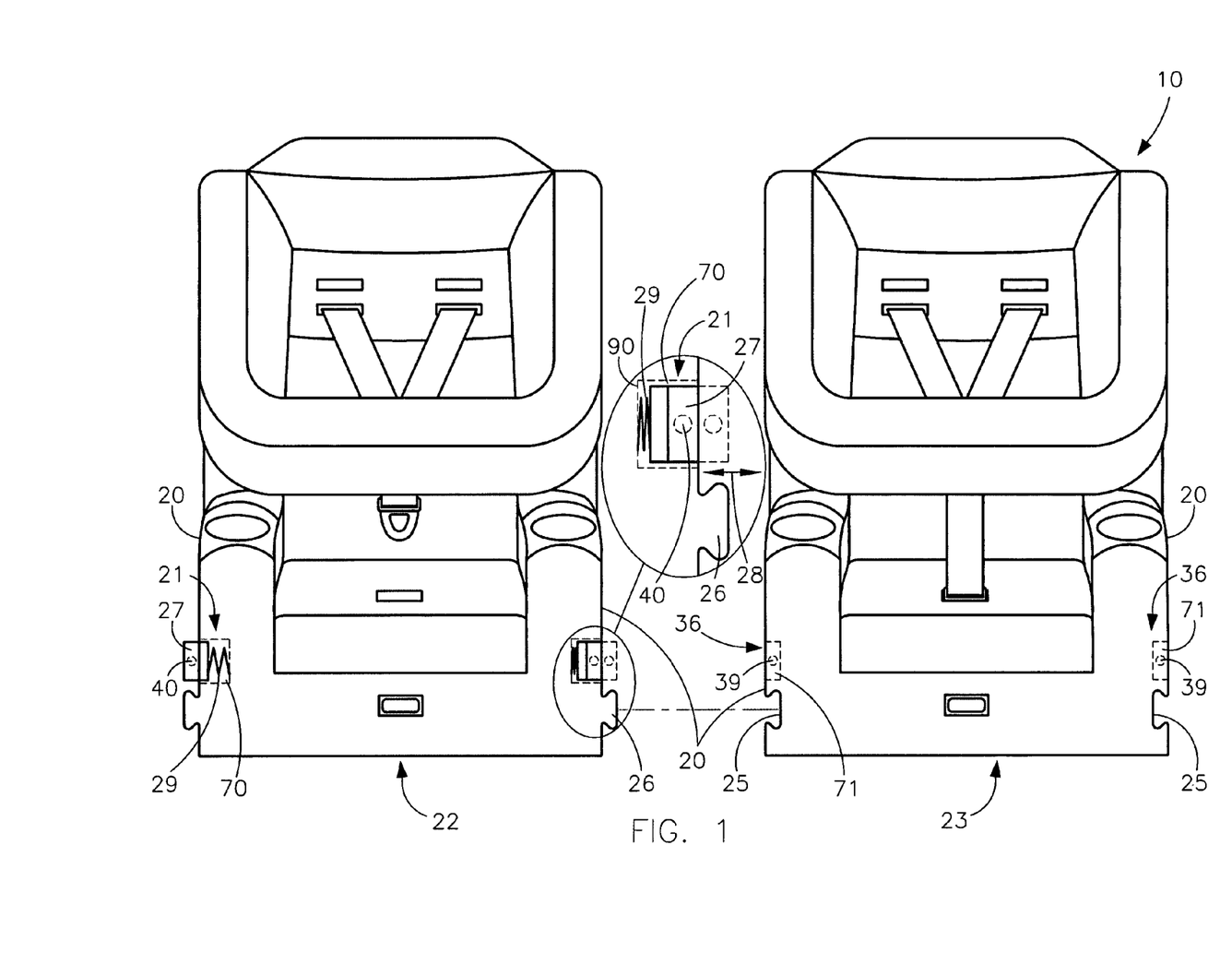
FIG. 1 is a front elevational view showing a multi-passenger vehicle child seat assembly at a disconnected position, in accordance with the present invention.
Figure 2:
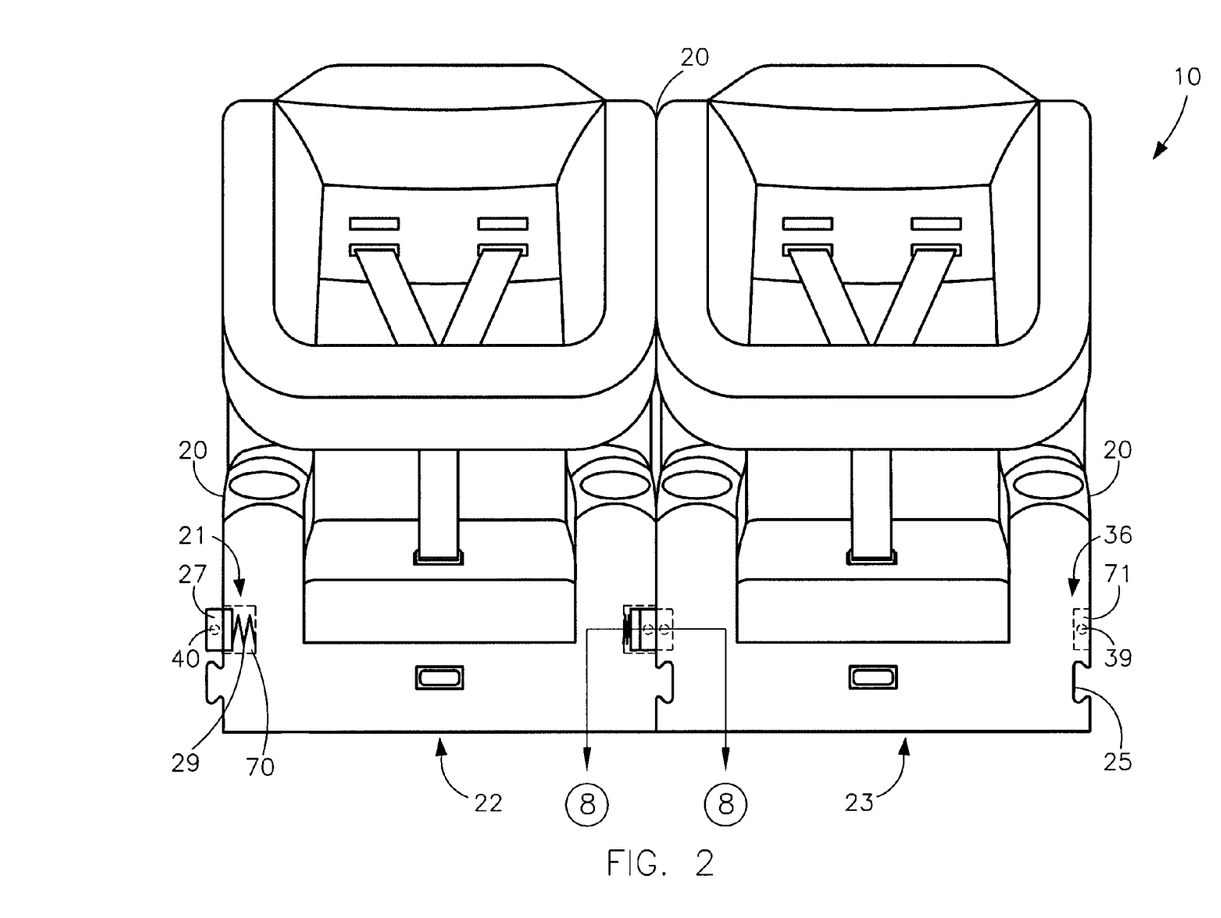
FIG. 2 is a front elevational view showing a multi-passenger vehicle child seat at a connected position, in accordance with the present invention.
Figure 3:
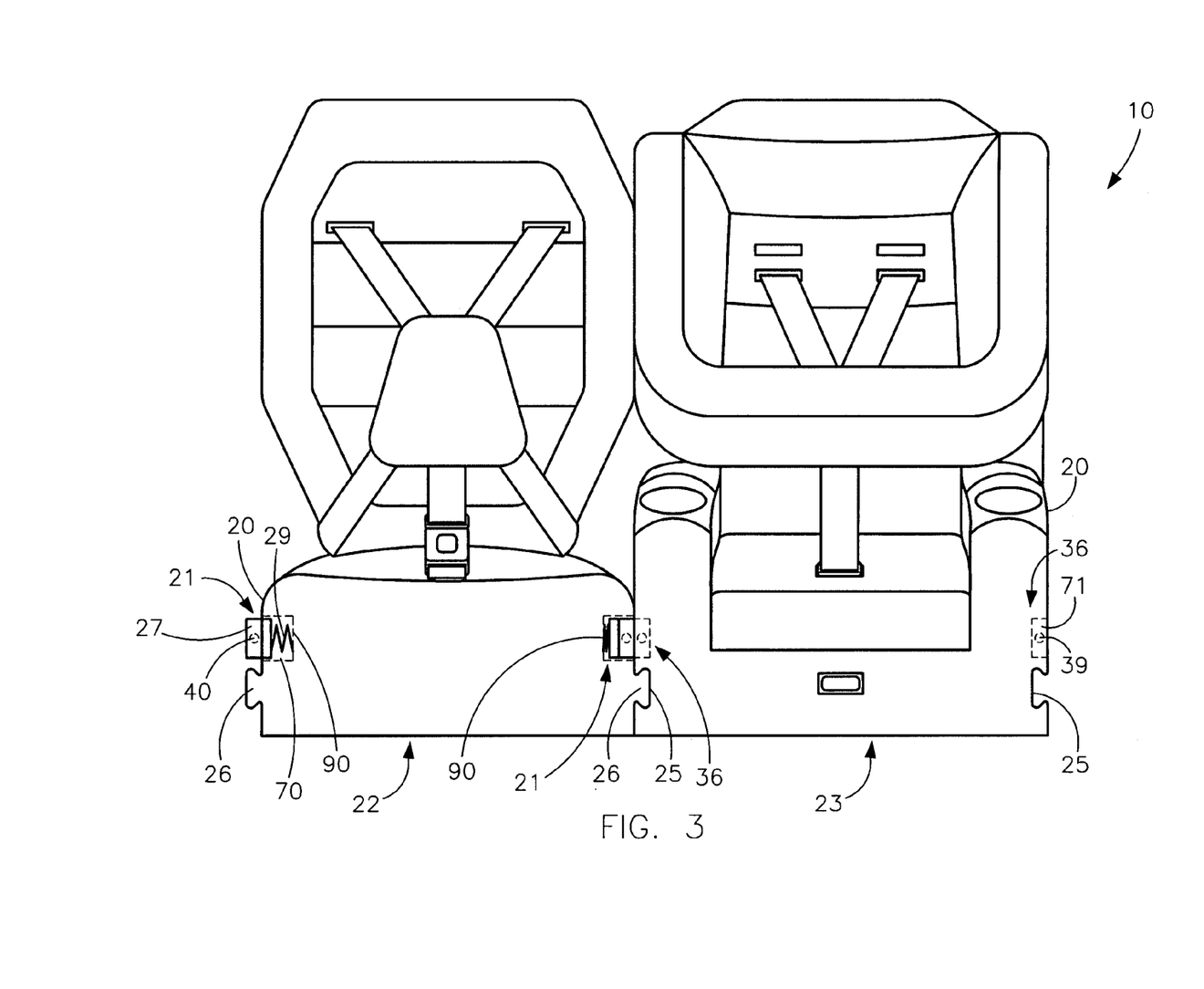
FIG. 3 is a front elevational view showing an alternate embodiment of the multi-passenger vehicle child seat at a connected position, in accordance with the present invention.
Figure 4:
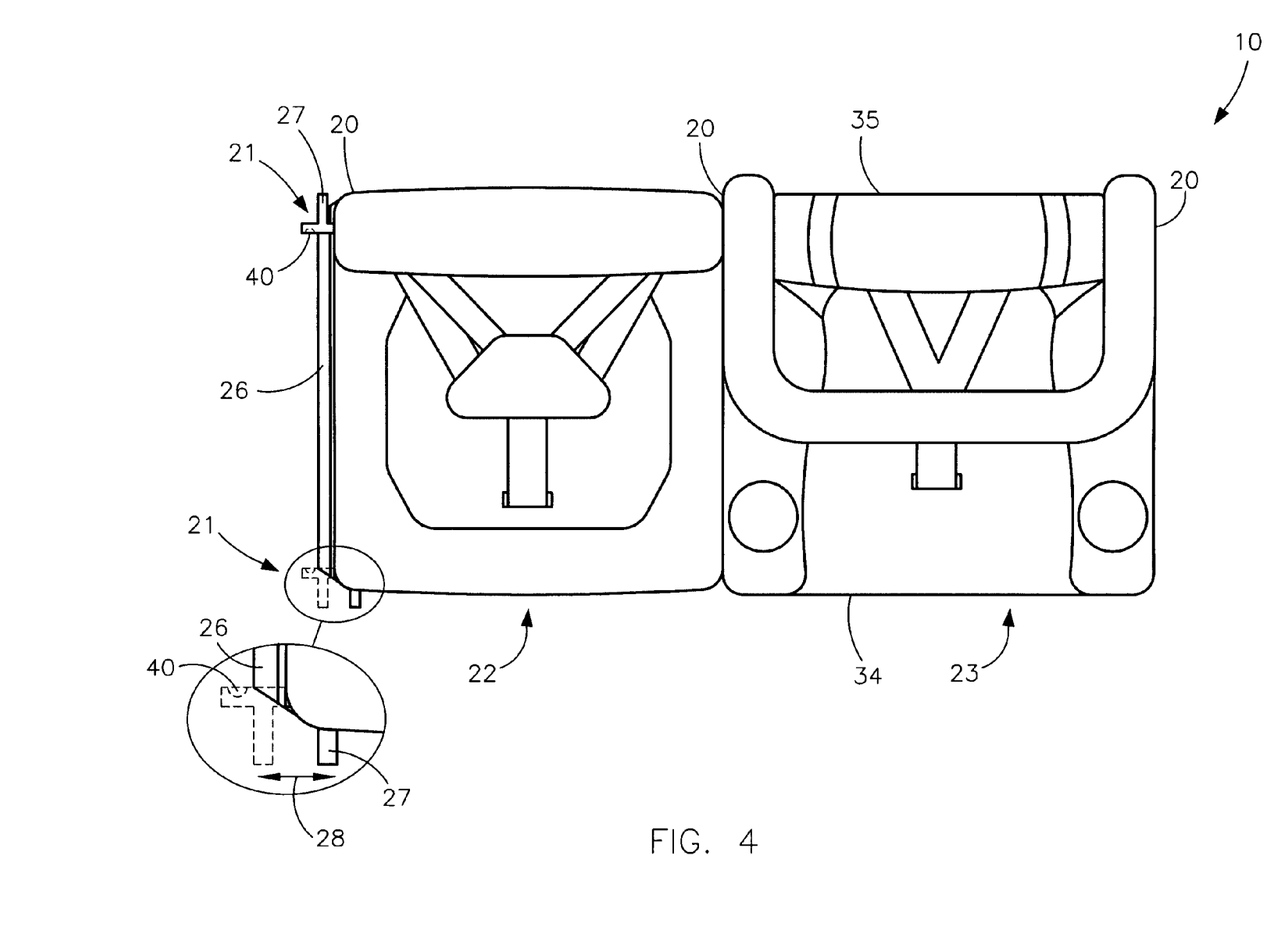
FIG. 4 is a top plan view showing the embodiment of FIG. 3.
Figure 5:
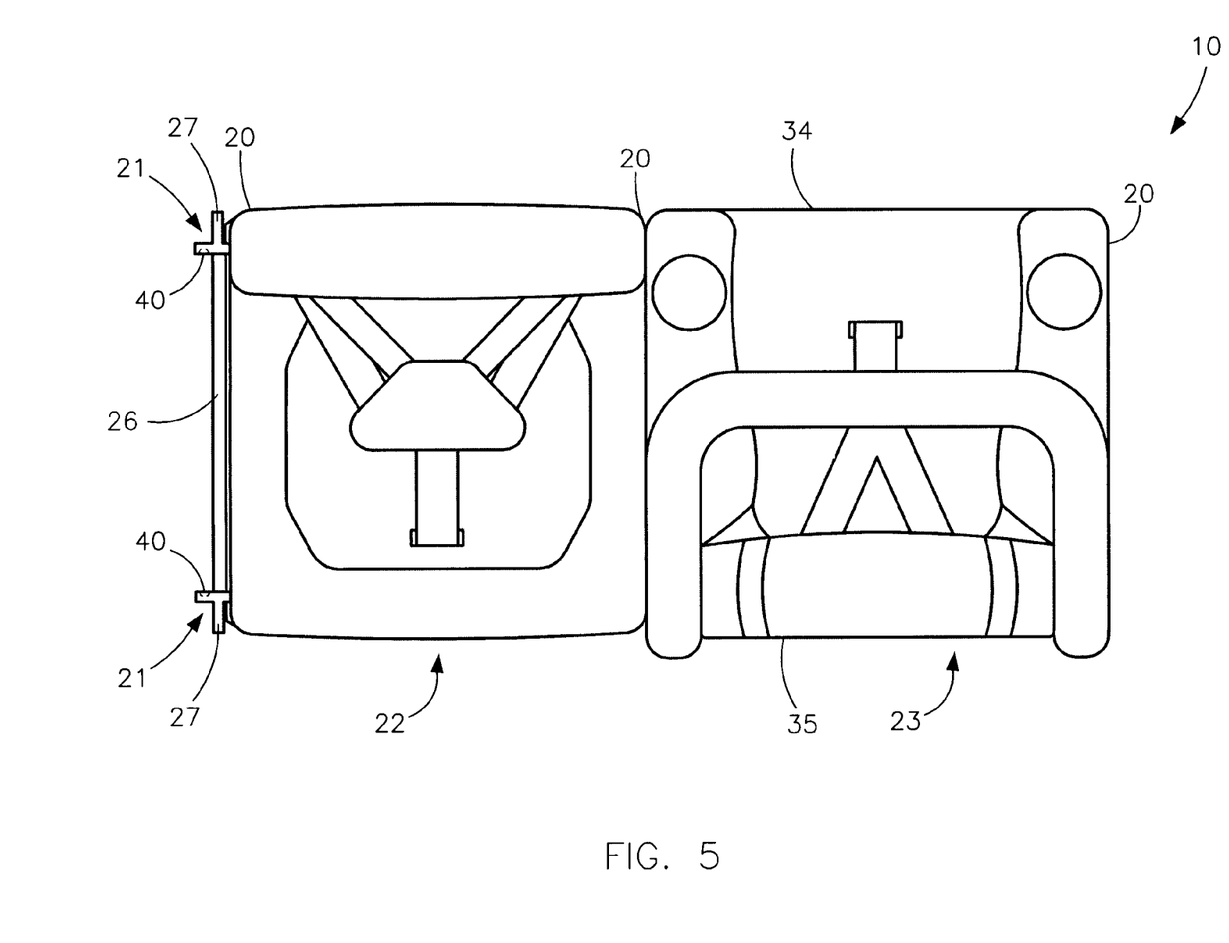
FIG. 5 is a top plan view showing the first and second child seats facing opposite directions, in accordance with the embodiment shown in FIGS. 3 and 4.
Figure 6:
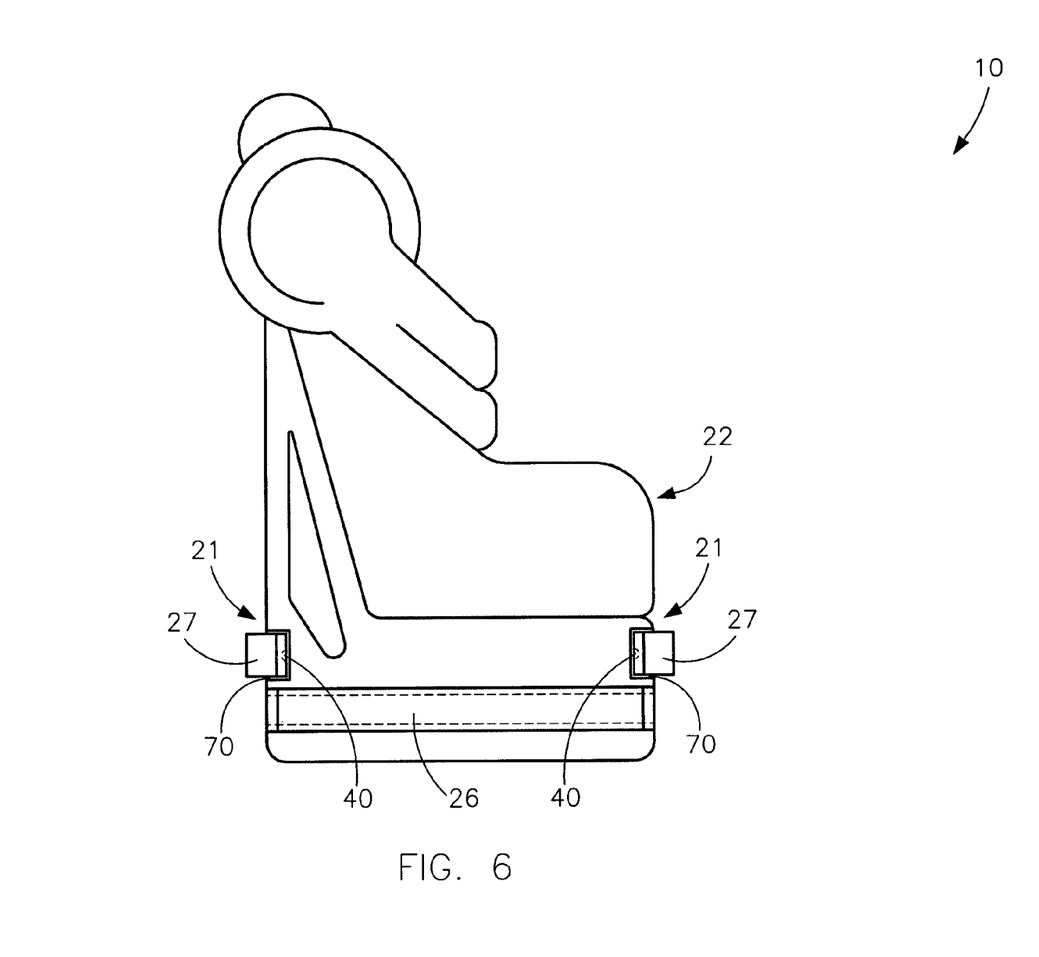
FIG. 6 is a left side elevational view of FIG. 2.
Figure 7:
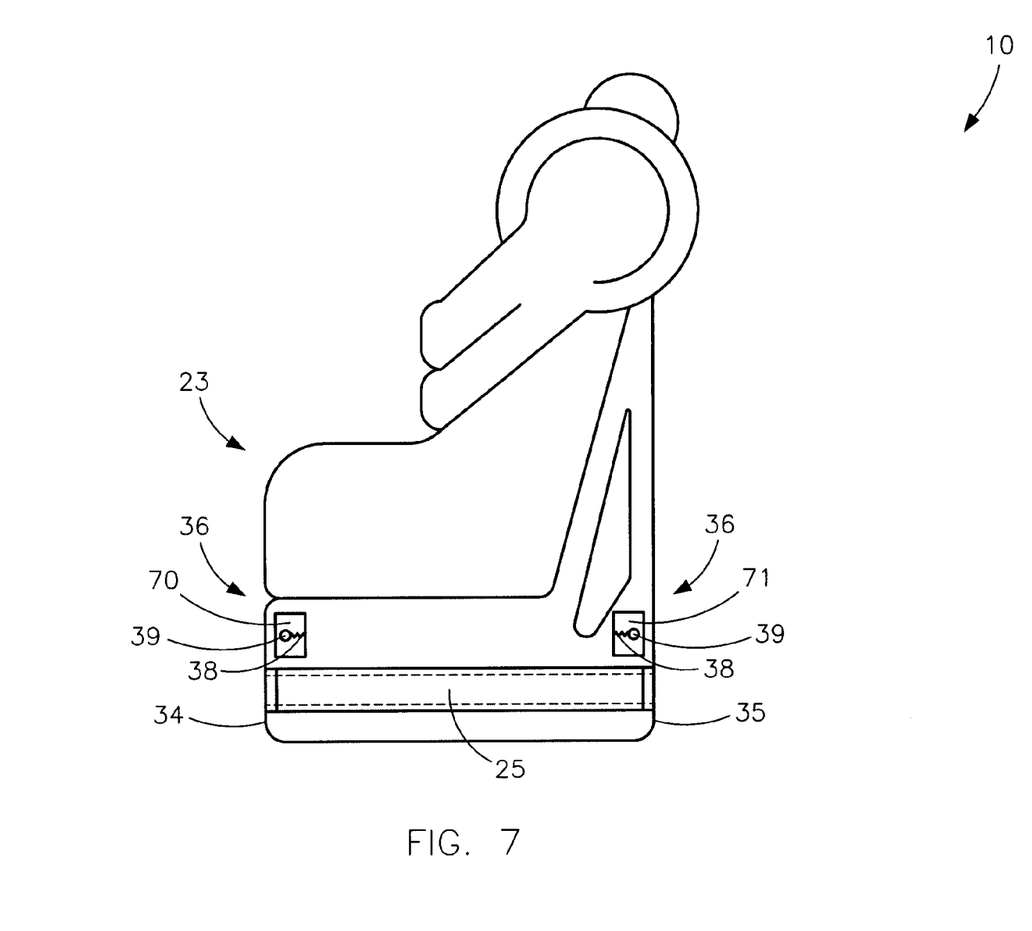
FIG. 7 is a right side elevational view of FIG. 2.
Figure 8A:
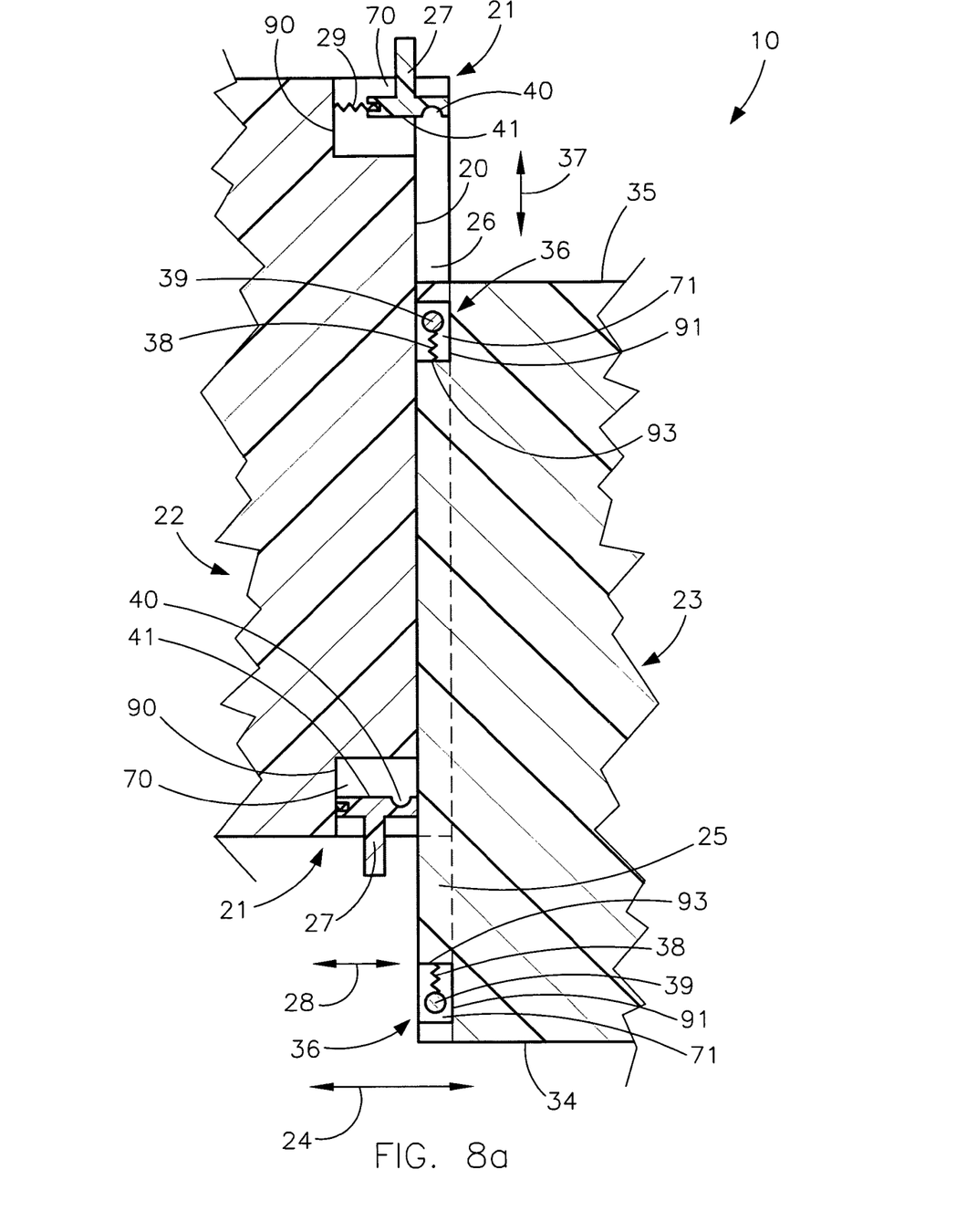
FIGS. 8a-8b are a cross sectional views showing the removably interlocking mechanism taken along line 8-8 as seen in FIG. 2 when adapted to locked and unlocked positions.
Figure 8B:
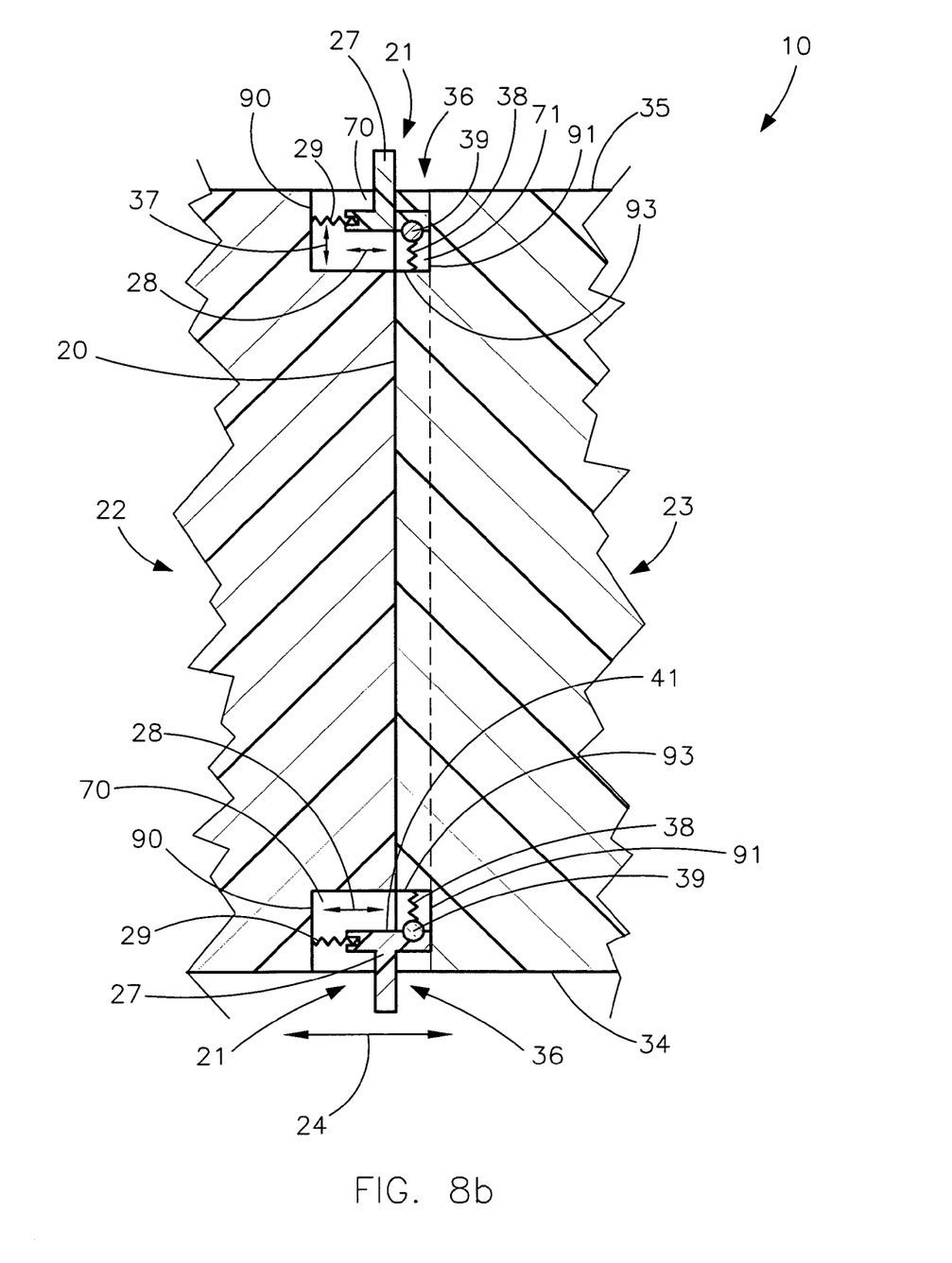
Figure 9:
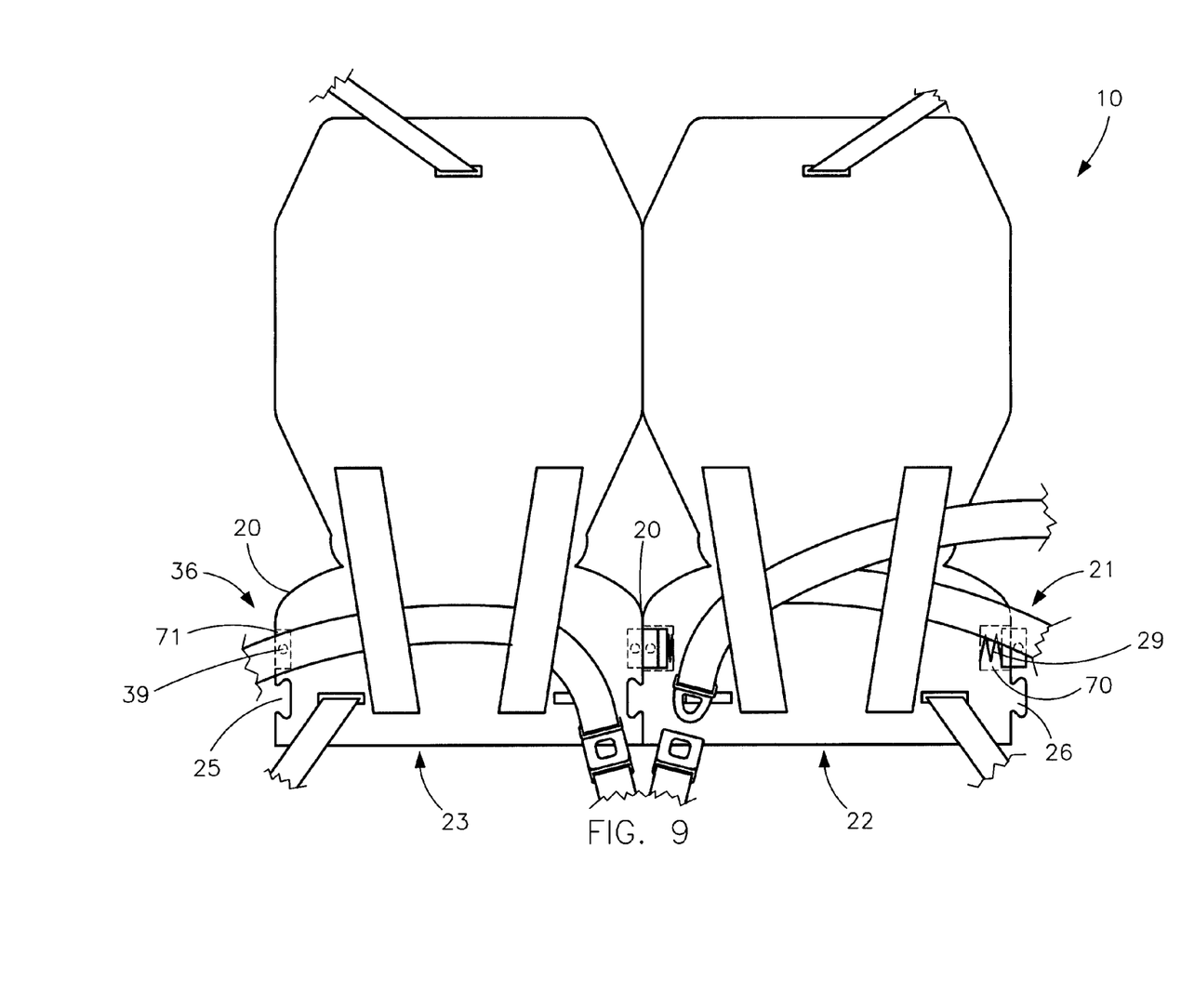
FIG. 9 is a rear elevational view of the multi-passenger vehicle child seat, in accordance with the present invention.

The assembly of this invention is referred to generally in FIGS. 1-9 by the reference numeral 10 and is intended to provide a multi-passenger vehicle child seat assembly and associated method. It should be understood that the assembly 10 may be used to provide an adult passenger with a means to comfortably sit with first and second infant passengers in the rear seat of many different types of vehicles and should not be limited in use only to the applications mentioned herein. For example, the present invention may be employed in sedans, sport utility vehicles, convertible vehicles, trucks, airplanes, trains, and other well known conventional transport mechanisms having rear seats.

Referring initially to FIGS. 1-9, a multi-passenger vehicle child seat assembly 10 may include corresponding planar medial edges 20 facing each other respectively. Such an assembly 10 may further include a mechanism 21 for removably interlocking the first 22 and second 23 vehicle child seats together by displacing medial edges 20 along a first linear travel path 24 until directly engaging each other. Such medial edges 20 are preferably aligned parallel to each other and may remain directly engaged along the entire longitudinal lengths thereof respectively. The first linear travel path 24 may be oriented perpendicular to the medial edges 20. The combination of such claimed elements provides an unpredictable and unexpected result which is not rendered obvious by one skilled in the art, wherein both the first 22 and second 23 child vehicle may occupy a small amount of space in a rear vehicle passenger seat. Thus, a rear vehicle passenger seat may be comfortably occupied by two infants or small children as well an adult passenger.

Again referring to FIGS. 1-9, the removably interlocking mechanism 21 may further include an elongated groove 25 formed within the second vehicle child seat 23 which may have a longitudinal length registered parallel to the medial edge 20 of the second vehicle child seat 23. The removably interlocking mechanism 21 also preferably includes a tongue 26 extending outwardly from the first vehicle child seat 22 and may have a longitudinal length registered parallel to the medial edge 20 of the first vehicle child seat 22. Such a tongue 26 may be slidably interfitted within the groove 25 when the medial edges 20 of the first 22 and second 23 vehicle child seats are engaged together.

The removably interlocking mechanism 21 may also include first 70 and second 71 pluralities of notches formed within the first 22 and second 23 vehicle child seats respectively and may be oppositely aligned along the medial edges 20 thereof respectively. The removably interlocking mechanism 21 may further include a plurality of couplings 27 adjustably seated within the first plurality of notches 70 and may be adjustably displaced outwardly therefrom along corresponding third linear travel paths 28 that terminate within the second plurality of notches 71 respectively such that the couplings 27 traverse the medial edges 20 when the first 22 and the second 23 vehicle child seat are interlocked together. This is vital for allowing a user to conveniently interlock the first 22 and second 23 vehicle child seats together without having to attach multiple clasps and closures, thus saving the user a considerable amount of time and energy.

Again referring to FIGS. 6, 7, 8a, and 8b, the couplings 27 are preferably adapted to removably interlocked positions within the second plurality of notches 71 when the first 70 and second 70 pluralities of notches are aligned with each other. The removably interlocking mechanism 21 may also include a plurality of first resilient spring members 29. Such a plurality of first resilient spring members 29 may have axially opposed ends statically anchored to a wall 90 of the first plurality of notches 70 and the couplings respectively 27. The first spring member 29 may be compressed while the first 70 and second 71 pluralities of notches are not oppositely aligned from each other respectively. Each of the second plurality of notches 71 may be spaced inwardly from the anterior 34 and posterior 35 sides of the second vehicle child seat 23 respectively. The couplings 27 may be frictionally urged along a planar receiving surface 91 defined within the second plurality of notches 71 when the couplings are biased to a terminating end of the third linear travel paths 28 respectively. The combination of such claimed elements provides an unpredictable and unexpected result which is not rendered obvious by one skilled in the art, wherein the couplings 27 allow a user to effectively engage and disengage the interlocking mechanism in order to conveniently connect or disconnect the first 22 and second 23 seats.

Again referring to FIGS. 8a and 8b, the assembly may also include a mechanism for absorbing impact forces 36 exerted against the first 22 and second 23 vehicle child seats by resiliently oscillating the medial edges 20 along a second linear travel path 37. Such a second linear travel path 37 is preferably registered parallel to the medial edges 20 and may extend along a minor portion of said longitudinal lengths thereof respectively. The first 24 and second 37 linear travel paths may be registered orthogonal to each other.

Again referring to FIGS. 1, 6, 7, 8a and 8b, the impact forces absorbing mechanism 36 preferably also includes a plurality of resilient second spring members 38 permanently seated with the second plurality of notches 71 respectively. Each of such second spring members 38 may be statically anchored to one wall 93 of the second pluralities of notches 71. The impact forces absorbing mechanism 36 may also include a plurality of ball bearings 39 connected to one end of the second spring members 38 respectively.

Again referring to FIGS. 1, 6, 7, 8a and 8b, the couplings 27 may be preferably provided with depressions 40 formed along one sidewall 41 thereof respectively. Such depressions 40 may receive the ball bearings 39 therein when the couplings 27 are displaced to the terminating end of the third linear travel paths 28 respectively and thereby maintain a tensioned interaction with the second spring members 38 when the couplings 27 are disposed within the second plurality of notches 71 respectively.

One of the second spring members 38 may be compressed along the second linear travel path 37 while another one of the second spring members 38 may be expanded along the second linear travel path 37 as the first spring members 29 are extended and retracted parallel to the first linear travel paths 24 respectively. The combination of such claimed elements provides an unpredictable and unexpected result which is not rendered obvious by one skilled in the art, wherein the first 22 and second 23 vehicle child seats may be securely fastened. This prevents the premature separation of the first 22 and second 23 seats in the event of an automobile collision or a sudden stop.

In one embodiment, the multi-passenger vehicle child seat assembly and associated method may be comprised of two, upright, bucket style safety seats designed to be utilized by infants or small children. This innovative seat combination may be manufactured from heavy duty plastic material and may preferably feature durable, stainless steel components. Most notably, the assembly preferably boasts two fully functioning and independent seats which may be incorporated into a single framework, thus the assembly may be installed using a single restraint system. All of the current features and requirements for modern car seats may be applied to the multi-passenger vehicle child seat assembly including a three to five point harness and a removable padded liner.

The present invention, as disclosed herein, provides an unexpected and unpredictable benefit by offering a double child seat assembly that is convenient and easy to use, is durable yet lightweight in design, is versatile in its applications, and permits an adult passenger to comfortably sit with first and second infant passengers in a rear seat of an existing vehicle. The assembly's unique interlocking features are an advantage to future travel, comfort and safety. Simple to use and easy to install, consumers will appreciate the space make available by utilizing the multi-passenger vehicle child seat assembly and associated method. Back seat passengers will be able to enjoy the space they need to be comfortable when riding with two small children. Safe and practical, this assembly would be ideal for use with twins.

While the invention has been described with respect to a certain specific embodiment, it will be appreciated that many modifications and changes may be made by those skilled in the art without departing from the spirit of the invention. It is intended, therefore, by the appended claims to cover all such modifications and changes that fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A multi-passenger vehicle child seat assembly for permitting an adult passenger to comfortably sit with first and second infant passengers in a rear seat of an existing vehicle, said multi-passenger vehicle child seat assembly comprising:

first and second vehicle child seats having corresponding planar medial edges facing each other respectively; and means for removably interlocking said first and second vehicle child seats together by displacing said medial edges along a first linear travel path until directly engaging each other, said medial edges being aligned parallel to each other and remaining directly engaged along entire longitudinal lengths thereof respectively;

means for absorbing impact forces exerted against said first and second vehicle child seats by resiliently oscillating said medial edges along a second linear travel path;

wherein said second linear travel path is registered parallel to said medial edges and extends along a minor portion of said longitudinal lengths thereof respectively.

2. The multi-passenger vehicle child seat assembly of claim 1, wherein said first and second linear travel paths are registered orthogonal to each other.

3. The multi-passenger vehicle child seat assembly of claim 2, wherein said removably interlocking means includes:

an elongated groove formed within said second vehicle child seat and having a longitudinal length registered parallel to said medial edge of said second vehicle child seat;

a tongue extending outwardly from said first vehicle child seat and having a longitudinal length registered parallel to said medial edge of said first vehicle child seat, said tongue being slidably interfitted within said groove when said medial edges of said first and second vehicle child seats are engaged together;

first and second pluralities of notches formed within said first and second vehicle child seats respectively and being oppositely aligned along said medial edges thereof respectively; and a plurality of couplings adjustably seated within said first plurality of notches and being adjustably displaced outwardly therefrom along corresponding third linear travel paths that terminate within said second plurality of notches respectively such that said couplings traverse said medial edges when said first and second vehicle child seats are interlocked together;

wherein said couplings are adapted to have removably interlocked positions within said second plurality of notches when said first and second pluralities of notches are aligned with each other.

4. The multi-passenger vehicle child seat assembly of claim 3, wherein said removably interlocking means includes:

a plurality of first resilient spring members having axially opposed ends statically anchored to a wall of said first plurality of notches and said couplings respectively, said first spring members being compressed while said first and second pluralities of notches are not oppositely aligned from each other respectively.

5. The multi-passenger vehicle child seat assembly of claim 4, wherein each of said second plurality of notches is spaced inwardly from said anterior and posterior sides of said second vehicle child seat respectively, said couplings being frictionally urged along planar receiving surfaces defined within said second plurality of notches when said couplings are biased to a terminating end of said third linear travel paths respectively.

6. The multi-passenger vehicle child seat assembly of claim 5, wherein said impact forces absorbing means includes:

a plurality of resilient second spring members permanently seated with said second plurality of notches respectively, each of said second spring members being statically anchored to one wall of said second plurality of notches respectively; and a plurality of ball bearings connected to one end of said second spring members respectively;

wherein said couplings are provide with depressions formed along one sidewall thereof respectively, said depressions receiving said ball bearings therein when said couplings are displaced to the terminating end of said third linear travel paths respectively and thereby maintaining a tensioned interaction with said second spring members when said couplings are disposed within said second plurality of notches respectively.

7. The multi-passenger vehicle child seat assembly of claim 6, wherein one of said second spring members is compressed along said second linear travel path while another one of said second spring members is expanded along said second linear travel path as said first spring members are extended and retracted parallel to said first linear travel paths respectively.

8. A multi-passenger vehicle child seat assembly for permitting an adult passenger to comfortably sit with first and second infant passengers in a rear seat of an existing vehicle, said multi-passenger vehicle child seat assembly comprising:

first and second vehicle child seats having corresponding planar medial edges facing each other respectively; and means for removably interlocking said first and second vehicle child seats together by displacing said medial edges along a first linear travel path until directly engaging each other, said medial edges being aligned parallel to each other and remaining directly engaged along entire longitudinal lengths thereof respectively, said first linear travel path being oriented perpendicular to said medial edges respectively;

means for absorbing impact forces exerted against said first and second vehicle child seats by resiliently oscillating said medial edges along a second linear travel path;

wherein said second linear travel path is registered parallel to said medial edges and extends along a minor portion of said longitudinal lengths thereof respectively.

9. The multi-passenger vehicle child seat assembly of claim 8, wherein said first and second linear travel paths are registered orthogonal to each other.

10. The multi-passenger vehicle child seat assembly of claim 9, wherein said removably interlocking means includes:

an elongated groove formed within said second vehicle child seat and having a longitudinal length registered parallel to said medial edge of said second vehicle child seat;

a tongue extending outwardly from said first vehicle child seat and having a longitudinal length registered parallel to said medial edge of said first vehicle child seat, said tongue being slidably interfitted within said groove when said medial edges of said first and second vehicle child seats are engaged together;

first and second pluralities of notches formed within said first and second vehicle child seats respectively and being oppositely aligned along said medial edges thereof respectively; and a plurality of couplings adjustably seated within said first plurality of notches and being adjustably displaced outwardly therefrom along corresponding third linear travel paths that terminate within said second plurality of notches respectively such that said couplings traverse said medial edges when said first and second vehicle child seats are interlocked together;

wherein said couplings are adapted to have removably interlocked positions within said second plurality of notches when said first and second pluralities of notches are aligned with each other.

11. The multi-passenger vehicle child seat assembly of claim 10, wherein said removably interlocking means includes:

a plurality of first resilient spring members having axially opposed ends statically anchored to a wall of said first plurality of notches and said couplings respectively, said first spring members being compressed while said first and second pluralities of notches are not oppositely aligned from each other respectively.

12. The multi-passenger vehicle child seat assembly of claim 11, wherein each of said second plurality of notches is spaced inwardly from said anterior and posterior sides of said second vehicle child seat respectively, said couplings being frictionally urged along planar receiving surfaces defined within said second plurality of notches when said couplings are biased to a terminating end of said third linear travel paths respectively.

13. The multi-passenger vehicle child seat assembly of claim 12, wherein said impact forces absorbing means includes:

a plurality of resilient second spring members permanently seated with said second plurality of notches respectively, each of said second spring members being statically anchored to one wall of said second plurality of notches respectively; and a plurality of ball bearings connected to one end of said second spring members respectively;

wherein said couplings are provide with depressions formed along one sidewall thereof respectively, said depressions receiving said ball bearings therein when said couplings are displaced to the terminating end of said third linear travel paths respectively and thereby maintaining a tensioned interaction with said second spring members when said couplings are disposed within said second plurality of notches respectively.

14. The multi-passenger vehicle child seat assembly of claim 13, wherein one of said second spring members is compressed along said second linear travel path while another one of said second spring members is expanded along said second linear travel path as said first spring members are extended and retracted parallel to said first linear travel paths respectively.

* * * * *